(12) United States Patent
Petrovffsky et al.

(10) Patent No.: US 10,993,383 B2
(45) Date of Patent: May 4, 2021

(54) PLANT GROW TRAY SYSTEM

(71) Applicants: Jason George Petrovffsky, Grass Valley, CA (US); Pierre Christopher Meister, Nevada City, CA (US)

(72) Inventors: Jason George Petrovffsky, Grass Valley, CA (US); Pierre Christopher Meister, Nevada City, CA (US)

(*) Notice: Subject to any disclaimer, the term of this patent is extended or adjusted under 35 U.S.C. 154(b) by 157 days.

(21) Appl. No.: 16/391,260

(22) Filed: Apr. 22, 2019

(65) Prior Publication Data

US 2019/0320604 A1    Oct. 24, 2019

Related U.S. Application Data

(60) Provisional application No. 62/662,214, filed on Apr. 24, 2018.

(51) Int. Cl.
| | |
|---|---|
| *A01G 9/24* | (2006.01) |
| *A01G 9/04* | (2006.01) |
| *A01G 13/08* | (2006.01) |
| *A01G 31/06* | (2006.01) |
| *A01G 31/02* | (2006.01) |

(52) U.S. Cl.
CPC ............ *A01G 9/246* (2013.01); *A01G 9/047* (2013.01); *A01G 13/08* (2013.01); *A01G 31/02* (2013.01); *A01G 31/06* (2013.01)

(58) Field of Classification Search
CPC .......... A01G 9/047; A01G 9/24; A01G 9/246; A01G 13/08; A01G 31/02; A01G 31/06
See application file for complete search history.

(56) References Cited

U.S. PATENT DOCUMENTS

| | | | | |
|---|---|---|---|---|
| 2,524,246 | A | * | 10/1950 | Young .................. A01G 9/1423 47/18 |
| 3,925,928 | A | * | 12/1975 | Constantinescu ...... A01G 9/246 47/17 |
| 4,198,783 | A | * | 4/1980 | Leroux .................. A01G 31/02 47/60 |
| 4,309,843 | A | * | 1/1982 | Kato ........................ A01G 9/00 47/18 |
| 4,514,930 | A | * | 5/1985 | Schorr .................. A01G 31/02 47/60 |
| 4,854,075 | A | | 8/1989 | Greiling |
| 4,884,366 | A | * | 12/1989 | Morton .................. A01G 31/02 47/62 C |

(Continued)

*Primary Examiner* — Ryan A Reis
(74) *Attorney, Agent, or Firm* — Ariel S. Bentolila; Bay Area IP, LLC

(57) ABSTRACT

A plant grow tray system comprising a plurality of trays comprising at least one upper tray and at least one bottom tray is provided. The upper tray is placed inside the bottom tray with upper tray supports between the upper tray and the bottom tray creating a space between the trays. The upper tray and the bottom tray comprise a sealing mechanism to seal the upper tray to the bottom tray. The upper tray has a corrugated profile with crest and trough portions, air holes on the corrugated surface, a drain basin, drain flange, and drain pipe. The bottom tray has an air-flow modifier, air flange, and a drain hole. The system is designed to allow air to be ducted or exhausted from the space between the upper tray and the bottom tray enabling the delivery of conditioned, fresh, or recirculated air directly to a plant.

20 Claims, 11 Drawing Sheets

(56) References Cited

U.S. PATENT DOCUMENTS

| | | | |
|---|---|---|---|
| 4,887,386 A * | 12/1989 | Minshull | A01G 31/02 47/48.5 |
| 5,664,370 A | 9/1997 | Boudreau et al. | |
| 2003/0101645 A1 | 1/2003 | Cole et al. | |

* cited by examiner

PLANT GROW TRAY SYSTEM

CROSS-REFERENCE TO RELATED APPLICATIONS

The present Utility patent application claims priority benefit of the U.S. provisional application for patent Ser. No. 62/662,214 titled "Ventilated Grow Tray" filed on 24 Apr. 2018 under 35 U.S.C. 119(e). The contents of this related provisional application are incorporated herein by reference for all purposes to the extent that such subject matter is not inconsistent herewith or limiting hereof.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relates to a plant grow tray system. More particularly, certain embodiments of the invention relate to a ventilated plant grow tray system.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Hydroponic and aeroponic methods for growing plants have gained lot of attraction with plant growers over the past few years. Research into appropriate equipment for these methods of growing plants have yielded a variety of tray like equipment in the art. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that certain plant tray design's available in the art include single tray; tray with no active delivery of air and/or catchment for irrigation runoff; single tray with planter cups that may constraining the placement, amount, and type of plants that may be planted; and the like. It may be appreciated by those skilled in the art that most greenhouse and indoor style plant growing environments may have a problem with mildews and pest infestations that may occur inside a closed area housing the plants due to stale and humid air being trapped in dense foliage. Typical grow environment ventilation may not provide adequate fresh condition air in dense indoor style plant growing environments directly from underneath to the underside of the leaf. Generally, a large percentage of leaf stomata are found on the underside of the leaf and this is where the plants exchange gases with the environment, i.e., breath. In typical ventilation systems for greenhouses and indoor grow environments, conditioned air flows horizontally either over the top or underneath the plant canopy and may not penetrate the foliage effectively.

One can expect that the failure to have proper ventilation may result in mildews, pest infestation, and like issues.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
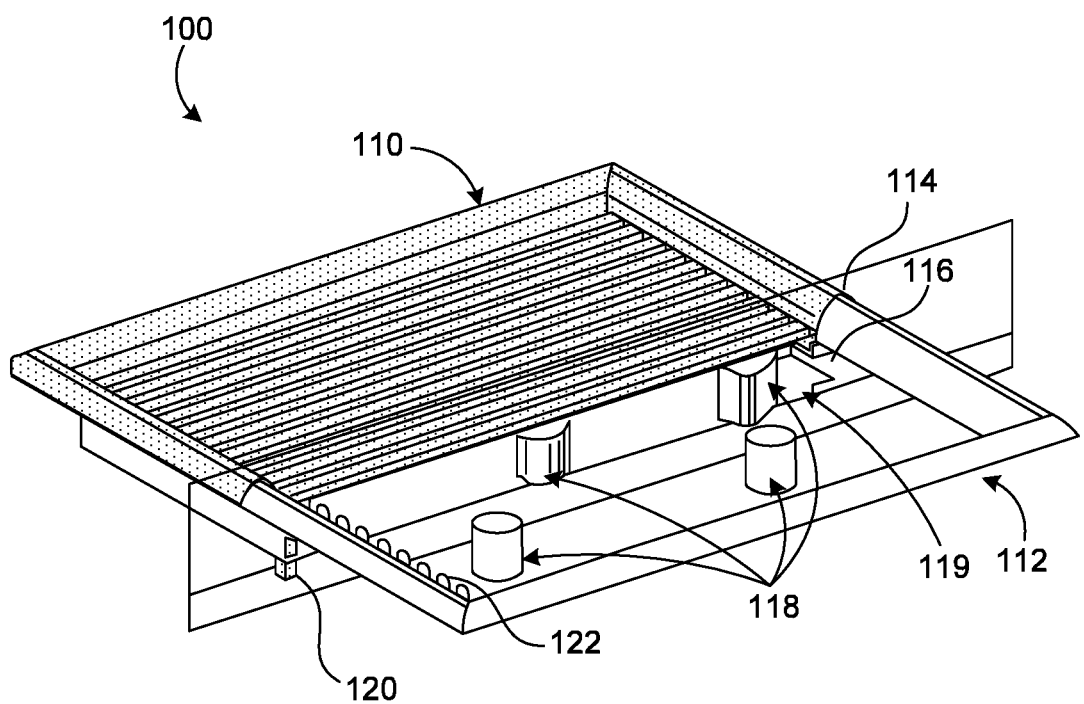
FIG. 1 illustrates a three-dimensional cross-sectional view of an exemplary plant grow tray system, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see *Ex parte Mallory,* 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.,* 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.,* 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon,* 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.,* 279 F.3d 1022 (Fed. Cir. 2002) (construing the terms "substantially constant" and "substantially below"); *Zodiac Pool Care, Inc.* v. *Hoffinger Indus., Inc.,* 206 F.3d 1408 (Fed. Cir. 2000) (construing the term "substantially inward"); *York Prods., Inc.* v. *Cent. Tractor Farm & Family Ctr.,* 99 F.3d 1568 (Fed. Cir. 1996) (construing the term "substantially the entire height thereof"); *Tex. Instruments Inc.* v. *Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek,* 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.,* 66 F.3d 1211, 1217, 36 USPQ2d 1225, 1229 (Fed. Cir. 1995); see, e.g., *Andrew Corp.* v. *Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In *re Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.*, 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Embodiments of the invention described herein generally relate to grow trays for plants. More particularly, certain embodiments of the invention relate to a ventilated plant grow tray that may create a positive pressure environment and improve air flow to the underside of a plant foliage canopy. This may help deliver vital gases and stabilize the overall temperature and humidity of the grow environment. In various embodiments, the plant grow tray described herein may include a two tray design that may create a sealed plenum to deliver air directly to the plant under some level of pressure (for example, air pressure provided by a fan); may provide a flexibility of using any grow container in any arrangement in soil or soil-less medium; may contain and funnel runoff irrigation water to be piped away from the plant grow tray; provide a supply of conditioned air vertically from underneath the plant foliage, and may employ a design that may use a corrugated surface to protect irrigation water from entering the air plenum and catch irrigation runoff.

In one embodiment, the plant grow tray described herein may deliver conditioned air directly from underneath the plant foliage (or canopy). This may help create a positive pressure environment that may assist to push stale air up and out from underneath the plant foliage (or canopy). In one embodiment, the stale air may be ventilated out through any known ventilation systems. It may be appreciated by a person with ordinary skill in the art, in light of and in accordance with the teachings of the present invention, that the solution may be to blow air evenly up from underneath of the foliage using the opposite effect of the leaves tendency to shingle downwards. Accordingly, by blowing air in an upward direction from the underside of the leaves, the leaves may be lifted, stimulated, and the naturally protected underside of the leaf may be effectively exposed to conditioned air. Further, as mentioned hereinabove, the stagnate air may be forced up and away from a protective bubble of the plant foliage where it may be ventilated. In one embodiment, conditioning the upward flow of air by employing the tray design described herein, may work to make a more consistent level of humidity, temperature and specific gas mixture in the plant grow environment. The plant grow design described herein may also help to maintain a consistent temperature at the root zone and may replace hydronic bench heating in certain settings.

In one embodiment, a plant tray is provided including a plurality of pieces. In an exemplary embodiment, is provided a plant tray having two pieces, i.e., a bottom tray and an upper tray. In one embodiment, an air plenum may be created in the floor of the plant tray i.e., in the bottom tray, to distribute air evenly upward through small holes in the upper tray, for example, like an "Air Hockey Table". The plant tray may further include a mechanism to collect irrigation water and drain it away from the plant grow environment and a fitting to hook in to an air distribution system on the side or bottom of the tray. In an exemplary embodiment, when the air distribution system may include a design wherein the air distribution system is disposed of on the bottom of the tray, the design may include an air distribution insert to help distribute the air through the plenum of the combined trays. In one embodiment, the upper tray may include a floor having a corrugated profile with holes located on the upper arc of the corrugated profile to distribute air upward and prevent water from entering the plenum. These air distribution holes may either be formed directly on top of the arc or on the upper sides of the arc with an awning type cover to shed water and keep the water from entering the bottom tray. It may be appreciated by a person with ordinary skill in the art, in light of and in accordance with the teachings of the present invention, that the lower arc of the corrugated profile may catch water from plant watering and funnel the water away through a drain using gravity.

FIG. 1 illustrates a three-dimensional cross-sectional view of an exemplary plant grow tray system 100, in accordance with an embodiment of the present invention. As shown in FIG. 1, the plant grow tray system 100 may include a two-tray system, i.e., a tray inside a tray system. Accordingly, plant grow tray system 100 may include an upper tray 110 and a bottom tray 112. Plant grow system 100 also includes a sealing mechanism 114, an air flange 116, an air-flow modifier 118, and a drain 120. It may be appreciated by a person with ordinary skill in the art, in light of and in accordance with the teachings of the present invention, that in one embodiment, the sealing mechanism 114 may function to connect/seal the upper tray 110 to the bottom tray 112. It may be appreciated by a person with ordinary skill in the art, in light of and in accordance with the teachings of the present invention, that in one embodiment, the sealing mechanism 114 may include a seal lip that may form a portion of the upper tray 110. In another embodiment, the sealing mechanism 114 may include a separate portion other than being part of the upper tray 110 and perform the function of sealing the upper tray and the bottom tray, for example, a sealant (not shown in figure) that may be used to create a gasket to seal the upper tray to the bottom tray. In certain other embodiments, the seal mechanism 114 may form a part of the bottom tray 112 and may be designed so as to perform the function of sealing the upper tray and the bottom tray.

In an exemplary embodiment illustrated in FIG. 1, the plant grow tray system may include an air flange 116. In one embodiment, the air flange 116 may form a portion of the bottom tray 112. In one embodiment, the air flange 116 provides an air supply port for connecting an air supply to the plant grow tray system 100 to enable air to be pumped into the plant grow tray system 100. In one embodiment, the plant grow tray system 100, may also include an air-flow modifier 118. It may be appreciated by a person with ordinary skill in the art, in light of and in accordance with the teachings of the present invention, that the number of air-flow modifier 118 or the number of air supply ports 116 and their placements in the bottom tray may depend on the size of the plant grow tray system 100. The air-flow modifiers 118 may function to effectively divert the air entering the space between the upper tray 110 and the bottom tray 112 through the air supply port 116. The air-flow modifiers 118, in certain embodiments, may also function as upper tray supports to minimize or prevent the upper tray from bulking and/or collapsing into the bottom tray. The upper tray 119 may also include a drain 120 to drain excess water away from the upper tray 110. In one embodiment, the drain 120 may be connected to or may connect a trough portion of the upper tray 110, wherein in one embodiment, the upper tray 110 may have a corrugated profile 122 with troughs and peaks. In one embodiment, the air-flow modifiers may include pillars extending from the bottom of the corrugations on the upper tray (not shown in figure) that properly space it from the lower tray designed the same way as the air-flow modifiers 118 on the bottom tray shown in FIG. 1.

Figure 2:
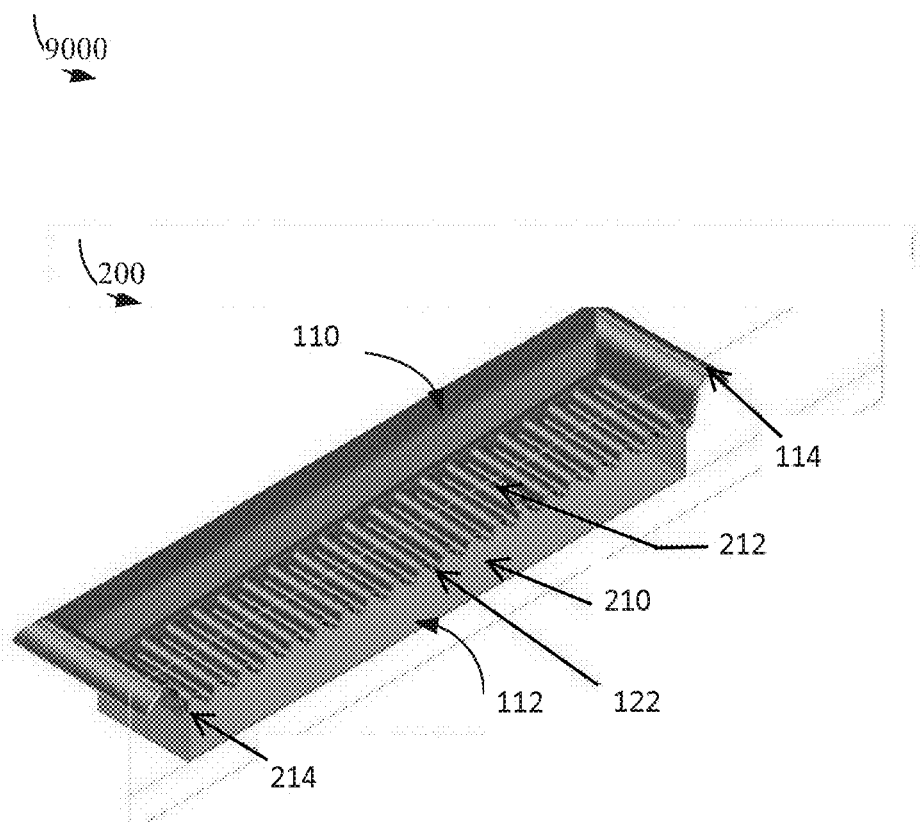
FIG. 2 illustrates a three-dimensional cross-sectional view of an exemplary plant grow tray system, in accordance with an embodiment of the present invention.
Figure 3:
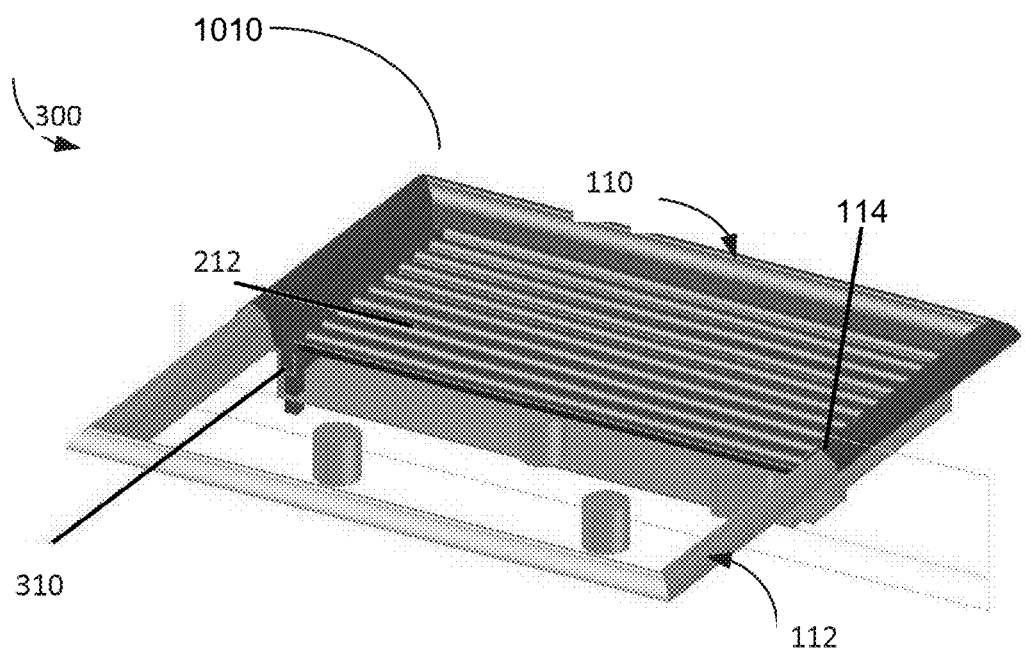
FIG. 3 illustrates a three-dimensional cross-sectional view of an exemplary plant grow tray system, in accordance with an embodiment of the present invention.

FIG. 2 illustrates a three-dimensional cross-sectional view of a plant grow tray system 200, in accordance with an embodiment of the present invention. In one embodiment, as shown in FIG. 2, the plant grow tray system 200 may create a ventilation plenum 210 between the upper tray 110 and the bottom tray 112. In one embodiment, a plurality of trays are employed, for example two trays as shown in FIG. 1, FIG. 2 and FIG. 3 to enable easier disassembly and cleaning of the plant grow tray system. Also illustrated in FIG. 2 are air holes 212, corrugated/ripple profile 122 of the upper tray 110, and ledge 214 of the bottom tray. In one embodiment, the air holes 212 may be disposed on the crest portion of the corrugated profile 122. The air flange 116 may be the air inlet that charges the ventilation plenum 210 with fresh conditioned air that may be expelled upwards through the air holes 212.

FIG. 3 illustrates a three-dimensional cross-sectional view of a plant grow tray system 300, in accordance with an embodiment of the present invention. As shown in FIG. 3, the plant grow tray system 300 may include a sealing mechanism 114 (for example, a seal lip), air holes 212 disposed on the crest portion of the corrugated profile 122 of the upper tray 110, and a drain basin 310 connecting the drain 120 (FIG. 1) to the trough portion of the corrugated profile 122 of the upper tray 110.

It may be appreciated by a person with ordinary skill in the art, in light of and in accordance with the teachings of the present invention, that the bottom tray 112 may provide the base of the plant grow tray system 100, 200, 300. The bottom tray may include a flat bottom, straight or slanted sides with an air flange 116 protruding from the exterior of any one of the sides of the bottom tray 112. In one embodiment, both upper tray 110 and bottom tray 112 may have vertical sides or slightly slanted out sides of varying height to contain water and help direct air upwards.

It may be appreciated by a person with ordinary skill in the art, in light of and in accordance with the teachings of the present invention, that the upper tray and bottom tray may be secured (sealed or connected) together using various methods known in the art. In one embodiment, the two trays may be snapped fit together like a box and its lid. In another embodiment, the two trays may be sealed together using a sealant. It may be appreciated by a person with ordinary skill in the art, in light of and in accordance with the teachings of the present invention, that the sealant may include any suitable sealant useful for such purpose. In another embodiment, the two trays may be secured together using a half inch, coarse, "A" tip screws driven through the outer most lip of the two trays i.e., the seal lip portion 114 of the upper tray 110 and the ledge 214 of the bottom tray. Accordingly, the upper tray the bottom tray may mate together at the outer lips which incorporate a ledge 214 and a seal lip 114 to seal ventilation air in the ventilation plenum 210. In certain exemplary embodiments, the ledge 214 may also serve to transfer the weight of plants and pots from the upper tray 110 to the bottom tray 112. In one embodiment, a sink or bathtub style overflow may be incorporated into the drain basin to prevent the water to flood through the air holes in to the ventilation plenum if a drain became plugged and the upper tray may get flooded.

Figure 4:
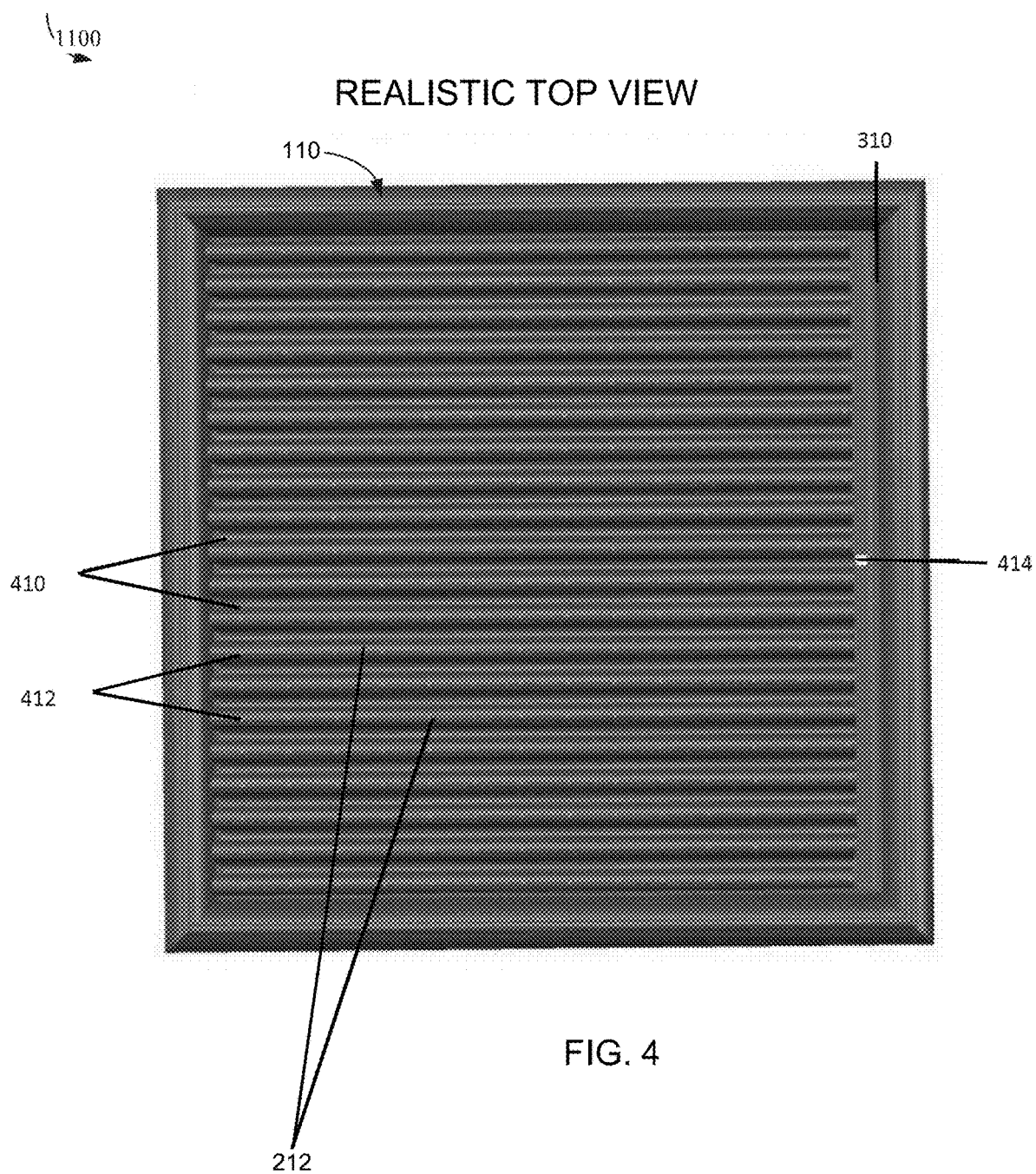
FIG. 4 illustrates a top view of an upper tray of an exemplary plant grow tray system, in accordance with an embodiment of the present invention.

FIG. 4 illustrates a top view of an upper tray of a plant grow tray system 400, in accordance with an embodiment of the present invention. As shown in FIG. 4, the top tray 110 may include a corrugated profile having crest portions 412 and trough portions 410. Air holes 212 may be disposed on the crest portions 412. The upper tray may also include an aperture. It is the lowest spot in theory of the upper tray to collect water and funnel it down through the drain. In one embodiment, the aperture may include a drain basin 414 either centered (as shown in FIG. 4) or to one end that collects water to be drained down a drain (not shown in figure) that penetrates through an opening in the bottom of the bottom tray. It may be appreciated by a person with ordinary skill in the art, in light of and in accordance with the teachings of the present invention, that the drain and the opening in the bottom of the bottom tray may have various shapes, including, but not limited to rectangle, square, round, star shaped, and the like, as long as the purpose of draining of water from the upper dray through the drain in the upper tray and the opening in the bottom tray is achieved effectively. The top view 400 also illustrates the drain 310 running along the length of the top tray on one side of the top tray 110 provided with the drain 120.

In one embodiment, as described with reference to FIGS. 1 to 4 the upper tray floor or surface may include a rippled (corrugated) surface profile 122. The air holes 212 disposed on the crest 412, i.e., the upper arc of the rippled surface profile 122 may be evenly spaced along the upmost apex of the crest 412. This upward arc along with the upwards flow of air may assist in stopping irrigation water from entering the ventilation plenum 210. On the other hand, the trough 410 i.e., the lower arc radius of the rippled surface profile 122 may collect excess irrigation water and drain water towards the drain basin 310 where water exits through the drain 120.

In one embodiment, the bottom tray may have columns that raise from the floor creating the upper tray supports 118. It may be appreciated by a person with ordinary skill in the art, in light of and in accordance with the teachings of the present invention, that the upper tray supports 118 may have any cross section as long as they serve the purpose of supporting and diverting air as described herein. In one embodiment, the upper tray supports may have a circular cross section. In one embodiment, the upper tray support 119 located closest to the air flange 116 may be shaped like a rounded triangle to help direct air evenly to both sides of the ventilation plenum 210. As mentioned herein above, the upper tray supports 118 may serve to transfer the bearing weight of plants and planting medium from the floor of the upper tray to the floor of the bottom tray through the columns forming the upper tray supports 118. As mentioned herein above, the upper tray supports may be attached to the bottom portion of the upper tray, in certain embodiments.

Figure 5:
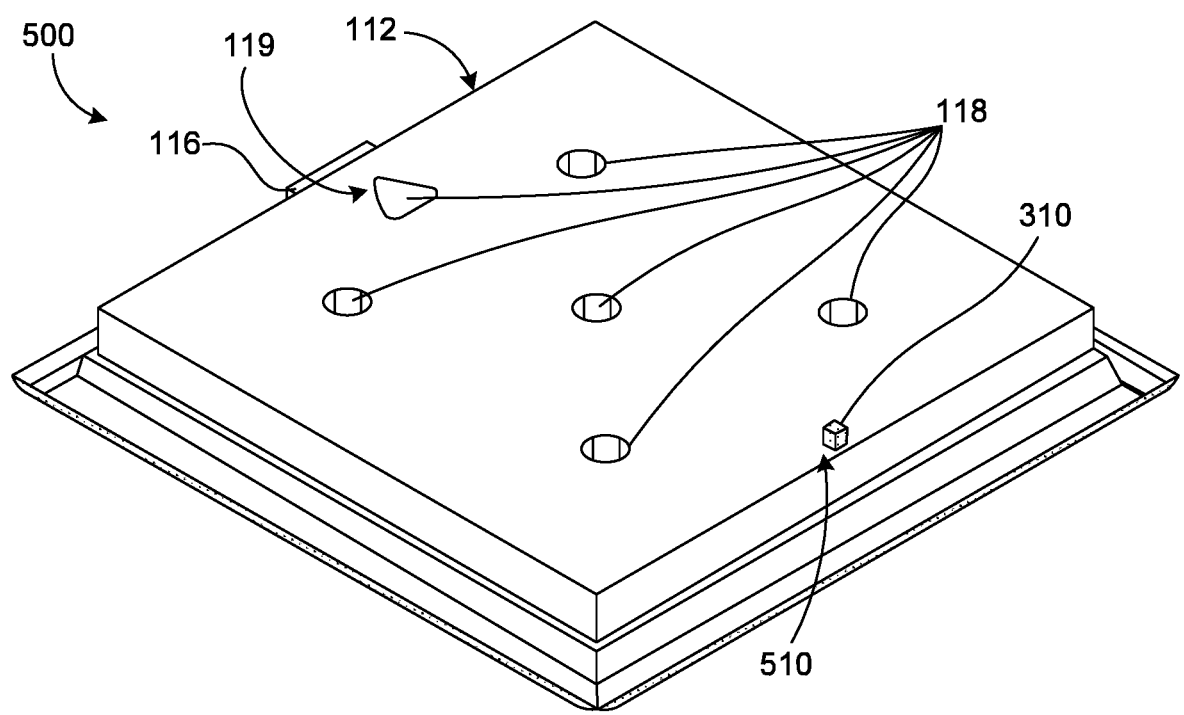
FIG. 5 illustrates a bottom view of a bottom tray of an exemplary plant grow tray system, in accordance with an embodiment of the present invention.

FIG. 5 illustrates a bottom view of a bottom tray of a plant grow tray system 500, in accordance with an embodiment of the present invention. As shown in FIG. 5, bottom view of the bottom tray 112 are seen weld joints of the supports 118, 119. It may be appreciated by a person with ordinary skill in the art, in light of and in accordance with the teachings of the present invention, that the supports 118, 119 may be either solid with mold joints or impressions or hollow and may be disposed either on the top portion of the bottom tray (shown in FIG. 5), or the lower portion of the upper tray (not shown in figure), or a combination of solid and hollow supports disposed on appropriate locations on the upper tray or the bottom tray, or a combination of solid and hollow supports disposed on the upper tray and the bottom tray forming a lock and key mechanism to seal the upper tray to the bottom tray (forming a sealing mechanism), and the like. In the present embodiment of bottom tray 112, as shown in the bottom view, the shape of upper tray supports 118 may be generally similar, with some deviations including that the upper tray support 119 may be located near air flange 116 which has a generally (substantially) triangular cross section with rounded edges (i.e., a wedge shaped divertor) to enable the support 119 to direct and distribute air entering from the air flange 116 relatively equally in all directions in the bottom tray 112. The bottom tray may also include an aperture 510 (drain aperture) for the drain pipe 310 connected to drain 120 from the upper tray to pass through.

Figure 6:
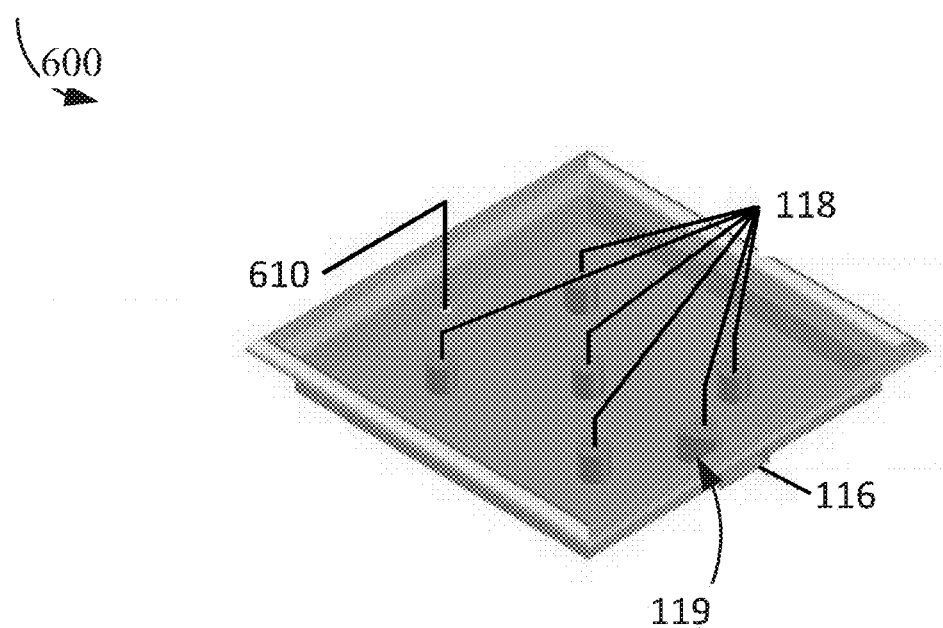
FIG. 6 illustrate a top view of a bottom tray of an exemplary plant grow tray system, in accordance with an embodiment of the present invention.

FIG. 6 illustrates a top view of an exemplary bottom tray of an exemplary plant grow tray system, in accordance with an embodiment of the present invention. In the present embodiment, a plant grow tray system 600 may include a bottom tray 112 (top view shown), which may further include upper tray supports 118. The bottom view also shows that the shape of the upper tray supports 118 are similar except for the upper tray support 119 located near the air flange 116 which has a relatively triangular cross section with rounded edges to enable the support 119 to direct and distribute air entering from the air flange 116 relatively equally in all directions in the bottom tray 112. The bottom tray may also include an aperture 610 for the drain pipe 310 from the upper tray to pass through.

Figure 7:
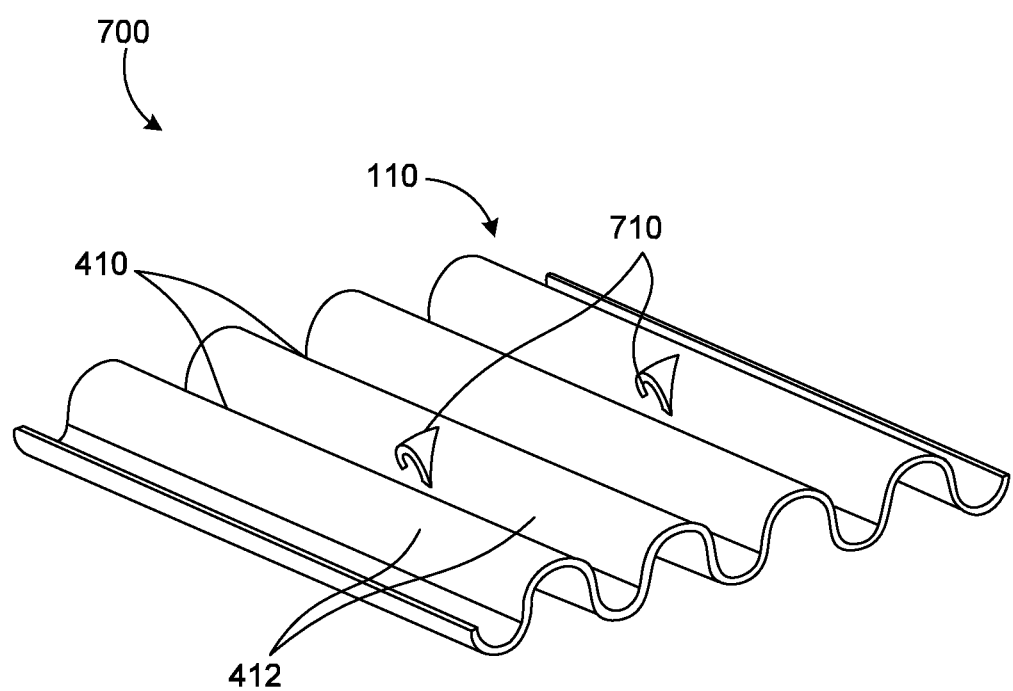
FIG. 7 illustrates a portion of a top view of an upper tray of an exemplary plant grow tray system, in accordance with an embodiment of the present invention.

FIG. 7 illustrates a portion of a top view of an upper tray of a plant grow tray system 700, in accordance with an embodiment of the present invention. As shown in FIG. 7, the top tray 110 may include a corrugated profile having crest portions 412 and trough portions 410. In the exemplary embodiment of the top view shown in FIG. 7, in place of air holes 212 (shown in FIG. 4) an air hole with an alternative design 710 may be disposed on the crest portions 412. In the embodiment shown in FIG. 7 instead of the air holes 212 being located at the top apex of the corrugation, the air holes with the alternative design 710, i.e., the awning shrouded side air hole may be located in the side of the upper arc of the corrugated upper tray surface. In one embodiment, the awning shroud side air holes 710 may be spaced on opposing corrugations offset from each other and the horizontal outward flow of air may be directed towards the opposing corrugation wall to help ramp up the air flow in a vertical direction. In this embodiment, the awning shroud side air holes 710 may shed irrigation water draining from the plant medium around the holes 710 and down to the crest 410 of the corrugated profile of the upper tray 110 to drain away such that the intrusion of water in to the air plenum 210 may be prevented.

Figure 8:
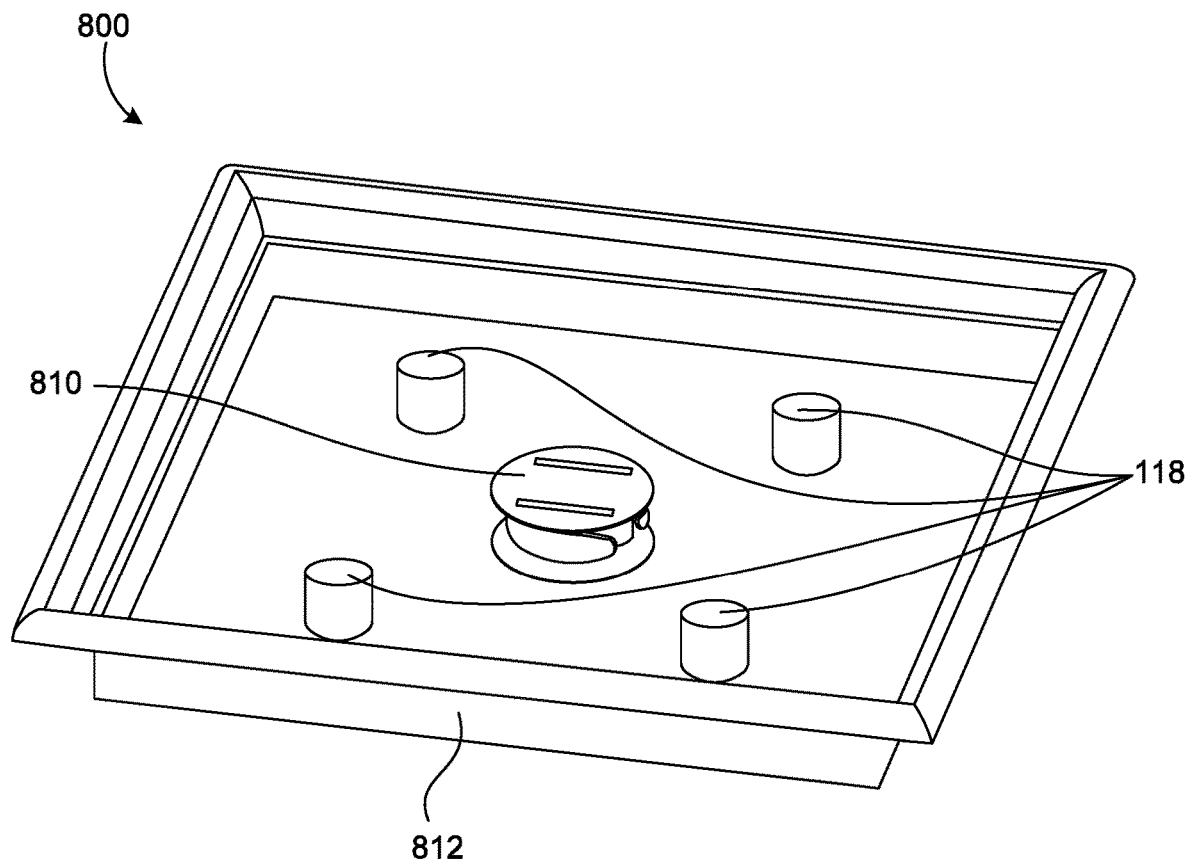
FIG. 8 illustrate a top view of a bottom tray of an exemplary plant grow tray system, in accordance with an embodiment of the present invention.

FIG. 8 illustrates a top view of a bottom tray of a plant grow tray system 800, in accordance with an embodiment of the present invention. As shown in FIG. 8, the top view 800 of the bottom tray 112 shows upper tray supports 118. In the exemplary embodiment shown in FIG. 8, the top view 800 shows the bottom tray to include an exemplary air-flow modifier in the form of a center support air distributor 810 located approximately at the center of the bottom tray. In this embodiment, the bottom tray may not include the air flange in location marked by 812. In certain embodiments, the bottom tray 112 may include multiple air inlets, and/or both the center support air distributor 810 and the air flange in location marked by 812.

Figure 9:
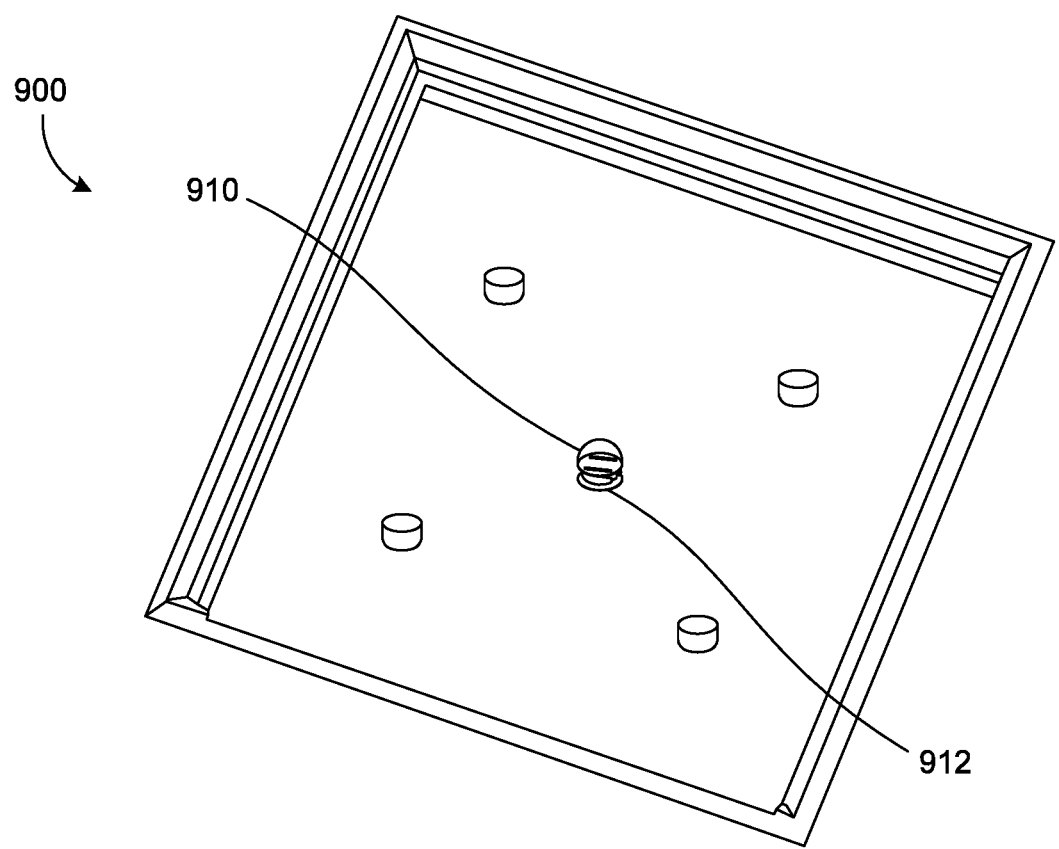
FIG. 9 illustrates a bottom view of a bottom tray of an exemplary plant grow tray system, in accordance with an embodiment of the present invention.

FIG. 9 illustrates a bottom view of a bottom tray of a plant grow tray system 900, in accordance with an embodiment of the present invention. As shown in FIG. 9, the bottom view 900 of the bottom tray 112 shows weld impressions or molded joints in the bottom section of the tray. In various embodiments, as mentioned hereinbefore the supports may be either solid with mold joints or impressions, or they may be hollow. In exemplary embodiments, the supports may be located either on the bottom tray, or on the upper tray, or they may be distributed on the upper portion of the bottom tray and the lower portion of the upper tray, or they may be distributed on the upper portion of the bottom tray and the lower portion of the upper tray in a manner such that they form a lock and key mechanism and may provide a sealing mechanism between the upper tray and the bottom tray, and the like. Furthermore, the supports may be of any size shape or number as long as they provide the function of supporting the upper tray. In the exemplary embodiment shown in FIG. 9, the bottom view 900 shows the bottom tray to include a round air flange 910. In one embodiment, the center support air distributor 810 may be inserted from the top into the bottom tray round air flange 910 to provide support for the upper tray and evenly distribute the incoming air in a horizontal fashion through the ventilation plenum (not shown in FIG. 9). In the exemplary embodiment, shown in FIG. 9 air flows "IN" 912 through the round air flange.

Figure 10:
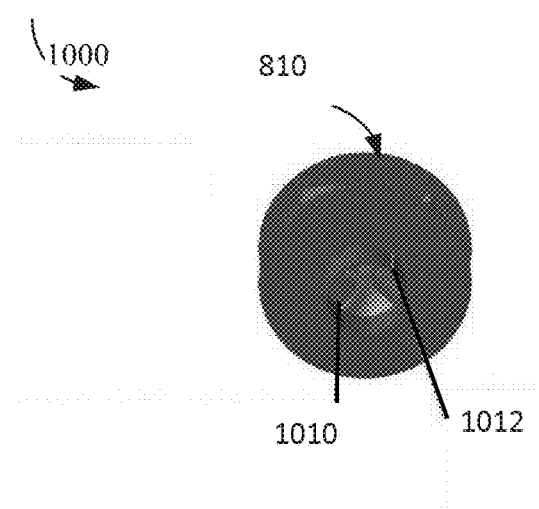
FIG. 10 illustrates a three-dimensional bottom view of a center support air distributor, in accordance with an embodiment of the present invention.

FIG. 10 illustrates a three-dimensional bottom view 1000 of a center support air distributor 810, in accordance with an embodiment of the present invention. As shown in FIG. 10, the bottom view 1000 of the center support air distributer 810 shows the location 1010 wherein the air flows in through the round air flange located in the center support air distributor 810. Further, in one embodiment, the round air flange may be held in place and prevented from rotating within the center support air distributor 810 using a lock-key mechanism 1012 It may be appreciated by a person with ordinary skill in the art, in light of and in accordance with the teachings of the present invention, that the slot is like a key on a pulley which may keep the air-flow distributer, i.e., the air diverter from spinning.

Figure 11:
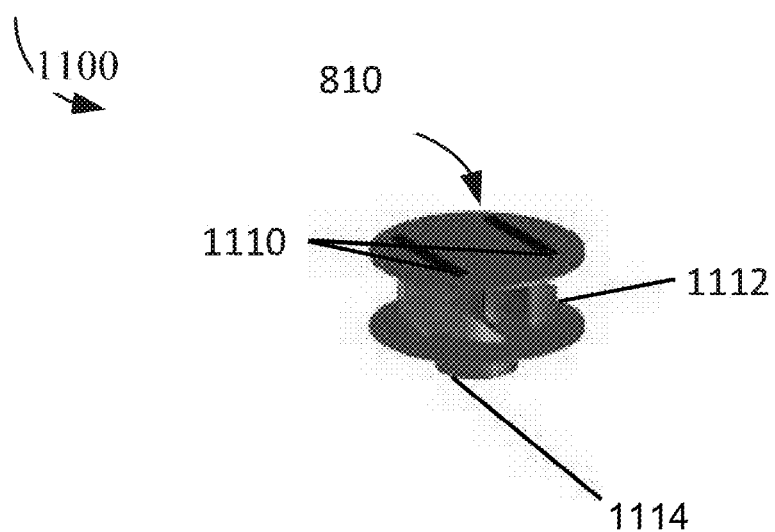
FIG. 11 illustrates a three-dimensional side view of a center support air distributor, in accordance with an embodiment of the present invention.

FIG. 11 illustrates a three-dimensional side view 1100 of a center support air distributor 810, in accordance with an embodiment of the present invention. As shown in FIG. 11, the side view 1100 of the center support air distributer 810 shows two support strips 1110 that may space the center support air distributor 810 from upper tray 110 to enable air to flow between them. The spiral air flow design 1112 of the round air flange fits into the round air flange 116 of the bottom tray and may assist in distributing air horizontally through the ventilation plenum (not shown in figure). It may be appreciated by a person with ordinary skill in the art, in light of and in accordance with the teachings of the present invention, that in certain embodiments the air flange in the bottom tray is a sleeve that the round air-flow modifier, i.e., the air diverter slides in to so that it is removable as a third piece and also acts as an upper tray support.

It may be appreciated by a person with ordinary skill in the art, in light of and in accordance with the teachings of the present invention, that in certain embodiments, holes may be included in the bottom and sides of the bottom tray 112 to let excess air ventilate around the trays. In one embodiment, the holes may be drilled while manufacturing the plant grow tray system disclosed herein. In another embodiment, a user may drill the holes before using the plant grow tray system disclosed herein.

It may be appreciated by a person with ordinary skill in the art, in light of and in accordance with the teachings of the present invention, that the plant grow tray system may be manufactured in varying widths, lengths, and heights depending on the environment the system is being used in and depending on the plants that may be grown in the plant grow tray system.

It may be appreciated by a person with ordinary skill in the art, in light of and in accordance with the teachings of the present invention, that the plant grow tray system may be made from any known material that may allow the plant grow tray system to be used with minimum deterioration of the material the tray may be made from. In certain embodiments, the trays may be made from acrylonitrile-butadiene-styrene polymer or any other appropriate polymer, for example, recycled polymer, bisphenol-A free polymer, and the like.

It may be appreciated by a person with ordinary skill in the art, in light of and in accordance with the teachings of the present invention, that in various embodiments the thickness of the various portions of the plant grow tray system i.e., the upper tray including its design features and the bottom tray including its design features may be based on the type of plants being grown, the environment in which the plant grow tray system may be disposed, etc.

It may be appreciated by a person with ordinary skill in the art, in light of and in accordance with the teachings of the present invention, that in various embodiments, the plant grow tray system may be used in various environmental conditions including but not limited to, environments having large fluctuating temperature ranges, for example, in direct sunlight or under high intensity grow lighting, and the like.

It may be appreciated by a person with ordinary skill in the art, in light of and in accordance with the teachings of the present invention, that the plant grow tray system disclosed herein may include a source for supplying air to air inlet flange. In one embodiment, the plant grow tray system disclosed herein may include at least one fan directly mounted to the air inlet flange. In one embodiment, the plant grow tray system disclosed herein may include conditioned air fed through ventilation ducting by a blower. In various embodiments, it may be appreciated by a person with ordinary skill in the art, in light of and in accordance with the teachings of the present invention, that the ventilation system and conditioning may be part of a much more complex ventilation system for the grow area that may be based around the concept of this tray ventilating the environment from the underneath.

Accordingly, in an exemplary embodiment is provided a plant grow tray system including (i) an upper tray with a corrugated surface and air holes in the upper tray that by design may resist the intrusion of water in to the ventilation plenum either by location or having an awning style cover to shed water to the lower arc/trough of the corrugations to drain away the water; (ii) a two tray design that may be disassembled for cleaning and creates an air ventilation plenum between the upper and bottom tray; (iii) an air-flow distributor insert in the bottom tray design that evenly redirects air horizontally through the ventilation plenum wherein the air may be coming in vertically through a bottom air inlet flange or a wedge shaped air diverter that helps to evenly distribute air from a side air inlet flange; (iv) a drain basin and drain flange in the upper tray that protrudes through the bottom footprint of the bottom tray to drain liquids away; (v) an extra arc profile (seal lip) in the upper edges of both trays that mates and helps to promote an air tight seal; and (vi) the bottom tray may have a side ledge and upper tray supports molded in to the shape to help transfer the weight of the upper tray to the bottom tray. In one embodiment, the plant grow tray system may be used for agricultural use.

In various embodiments, the plant grow tray system disclosed herein may have various advantages. The system may create a grow platform that targets the exact foot print of the grow area and delivers conditioned air directly to the plant right at planting medium and up. This may create a flow of air continually moving up through the foliage and away from the plant to make a clean bubble of conditioned air to protect the plants from invasive pests and diseases. It may be appreciated by a person with ordinary skill in the art, in light of and in accordance with the teachings of the present invention, that if the air is conditioned by air purification techniques and temperature/humidity and specific gas level control then the system may create a bubble of absolutely clean and conditioned air ideal for plant growth that may be delivered directly to the plant. It may be appreciated by a person with ordinary skill in the art, in light of and in accordance with the teachings of the present invention, that the plant grow tray system described herein may lead to substantial decrease in operating expenses due to the fact the grower/user may not try to condition the entire grow area but just the exact footprint and elevation of plant growth. The plant grow tray system described herein may provide lowered operating costs and lowered use of pesticides and mildewcide in certain embodiments.

In various embodiments, the plant grow tray system described herein may target very large floor spaces such as acre size greenhouses or indoor rack growing environments and effectively condition the air right at the plant as opposed to the whole environment being conditioned in typical ventilation systems currently in use. Since the air distribution is from the bottom it may not block any natural light and creates a positive pressure environment where filtered air movement may push invasive pests and plant diseases away from the plants. The system in one embodiment, may replace hydronic style bench heating while more efficiently placing conditioned air exactly where it is needed. In certain exemplary embodiments, the trays may be made strong enough to support the load of plant containers, media, and foliage. The trays may be manufactured to provide trays with different strength by using appropriate polymers known in the art, or with metal, or a combination thereof. In one embodiment, the trays may be used to mix carbon-dioxide in the air stream to increase plant growth. In certain embodiments, cooled or heated air may be mixed in to the air stream to provide direct heating or cooling to the plants. Furthermore, in certain embodiments, moisture may be added or removed from the air stream to adjust the relative humidity of the air delivered to the plants. In another exemplary embodiment, air may be sucked from the trays creating a negative pressure environment or air flow may be reversed to strengthen the plants or remove stale air from beneath the plants. For example, extremely hot air or cold air may be passed through the trays to force plants to ripen or maybe apply stress to the foliage, or in place of pesticides or fungicides by means of killing bugs or funguses.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a plant grow tray system according to the present invention will be apparent to those skilled in the art. Various aspects of the invention have been described above by way of illustration, and the specific embodiments disclosed are not intended to limit the invention to the particular forms disclosed. The particular implementation of the plant grow tray system may vary depending upon the particular context or application. By way of example, and not limitation, the plant grow tray system described in the foregoing were principally directed to ventilated plant grow tray systems implementations; however, similar techniques may instead be applied this tray could be used to treat the plants with any type of gas that acts either as a pesticide or fungicide or application of carbon-dioxide to increase plant growth or health, and the like, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system comprising:
   a plurality of trays comprising at least one upper tray and at least one bottom tray;
   wherein the upper tray is placed inside the bottom tray with upper tray supports between the upper tray and the bottom tray creating a space between the upper tray and the bottom tray;
   wherein the upper tray and the bottom tray comprise a sealing mechanism to seal the upper tray to the bottom tray;
   wherein the upper tray has a corrugated profile with crest and trough portions, air holes on the corrugated surface, a drain basin, a drain flange, and a drain pipe;
   wherein the bottom tray has an air-flow modifier, an air flange, and a drain hole corresponding to the drain pipe in the upper tray;
   wherein the system is a plant grow tray system and wherein the system is designed to allow air to be ducted or exhausted from the space between the upper tray and the bottom dray enabling the delivery of conditioned, fresh, or recirculated air directly to a plant.

2. The system of claim 1, wherein the air holes are disposed on the crest portion of the corrugated profile of the upper tray.

3. The system of claim 1, wherein the air holes are in the form of awning shrouded air holes located in the side of the upper arc of the corrugated profile of the upper tray.

4. The system of claim 1, wherein the air-flow modifier is an air diverter.

5. The system of claim 1, wherein the air-flow modifier is an air-supply distributor, wherein the air-flow modifier is an upper tray support having a substantially triangular cross-section to enable the upper tray support to direct and distribute air entering from the air flange relatively equally in all directions in the bottom tray.

6. The system of claim 1, wherein the upper tray supports are disposed on the top portion of the bottom tray.

7. The system of claim 1, wherein the upper tray supports are disposed in the bottom portion of the trough section of the corrugated profile of the upper tray.

8. The system of claim 1, wherein the upper tray supports are solid with mold impressions.

9. The system of claim 1, wherein the upper tray supports are hollow.

10. The system of claim 1, wherein the sealing mechanism comprises an extra-arc profile in the upper edges of both trays comprising a seal-lip in the upper tray and a corresponding ledge in the bottom tray that mate and provide an airtight seal.

11. The system of claim 1, wherein the sealing mechanism comprises a sealant that can create a gasket to seal the upper tray to the bottom tray.

12. The system of claim 1, wherein the sealing mechanism comprises hollow and solid upper tray supports disposed on the upper tray and the lower tray.

13. The system of claim 1, wherein the air flange has a rectangular cross-section.

14. The system of claim 1, wherein the drain hole in the bottom tray and the drain pipe in the upper tray have a rectangular cross-section.

15. The system of claim 1, wherein the bottom tray comprises both an air-supply diverter and an air-supply distributor.

16. A system comprising:
   a plurality of trays comprising at least one upper tray and at least one bottom tray;
   wherein the upper tray is placed inside the bottom tray with upper tray supports between the upper tray and the bottom tray creating a space between the upper tray and the bottom tray;
   wherein the upper tray and the bottom tray comprise a sealing mechanism capable of sealing the upper tray to the bottom tray, the sealing mechanism comprising an extra-arc profile in the upper edges of both trays comprising a seal-lip in the upper tray and a corresponding ledge in the bottom tray that mate and provide an airtight seal;
   wherein the upper tray has a corrugated profile with crest and trough portions, air holes on the corrugated surface, a drain basin, a drain flange, and a drain pipe;
   wherein the bottom tray has an air-flow modifier, an air flange, and a drain hole corresponding to the drain pipe in the upper tray;
   wherein the system is a plant grow tray system and wherein the system is designed to allow air to be ducted or exhausted from the space between the upper tray and the bottom dray enabling the delivery of conditioned, fresh, or recirculated air directly to a plant.

17. The system of claim 16, wherein the air holes are disposed on the crest portion of the corrugated profile of the upper tray.

18. The system of claim 16, wherein the air holes are in the form of awning shrouded air holes located in the side of the upper arc of the corrugated profile of the upper tray.

19. A system comprising:
   a plurality of trays comprising at least one upper tray and at least one bottom tray;

wherein the upper tray is placed inside the bottom tray with upper tray supports between the upper tray and the bottom tray creating a space between the upper tray and the bottom tray;

wherein the upper tray and the bottom tray comprise a sealing mechanism to seal the upper tray to the bottom tray;

wherein the upper tray has a corrugated profile with crest and trough portions, air holes on the corrugated surface, a drain basin, a drain flange, and a drain pipe;

wherein the bottom tray has an air-flow diverter, an air-flow distributor, an air flange, and a drain hole corresponding to the drain pipe in the upper tray;

wherein the system is a plant grow tray system and wherein the system is designed to allow air to be ducted or exhausted from the space between the upper tray and the bottom dray enabling the delivery of conditioned, fresh, or recirculated air directly to a plant.

20. The system of claim 19, wherein the sealing mechanism comprises an extra-arc profile in the upper edges of both trays comprising a seal-lip in the upper tray and a corresponding ledge in the bottom tray that mate and provide an airtight seal.

\* \* \* \* \*